(12) United States Patent
Gomadam et al.

(10) Patent No.: US 9,178,591 B2
(45) Date of Patent: *Nov. 3, 2015

(54) CODEBOOK SUBSAMPLING FOR PUCCH FEEDBACK

(71) Applicant: MARVELL WORLD TRADE LTD., St. Michael (BB)

(72) Inventors: Krishna Srikanth Gomadam, Santa Clara, CA (US); Adoram Erell, Herzliya, IL (US)

(73) Assignee: MARVELL WORLD TRADE LTD., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 14/296,474

(22) Filed: Jun. 5, 2014

(65) Prior Publication Data

US 2014/0286452 A1 Sep. 25, 2014

Related U.S. Application Data

(63) Continuation of application No. 13/252,218, filed on Oct. 4, 2011, now Pat. No. 8,750,404.

(60) Provisional application No. 61/390,511, filed on Oct. 6, 2010, provisional application No. 61/392,431, filed on Oct. 12, 2010.

(51) Int. Cl.
*H04L 1/02* (2006.01)
*H04B 7/04* (2006.01)
(Continued)

(52) U.S. Cl.
CPC ............ *H04B 7/0478* (2013.01); *H04B 7/0417* (2013.01); *H04B 7/0486* (2013.01); *H04B 7/0639* (2013.01); *H04B 7/065* (2013.01); *H04L 1/0618* (2013.01)

(58) Field of Classification Search
CPC ..................................................... H04B 7/0491
See application file for complete search history.

(56) References Cited

U.S. PATENT DOCUMENTS 6,466,904 B1 * 10/2002 Gao et al. ....................... 704/220
2008/0095258 A1 * 4/2008 She et al. ........................ 375/262
(Continued)

FOREIGN PATENT DOCUMENTS

| GB | 2456217 A | 7/2009 |
|---|---|---|
| WO | 2008085096 A1 | 7/2008 |
| WO | 2009023700 A2 | 2/2009 |

OTHER PUBLICATIONS

U.S. Appl. No. 13/669,476 Office Action dated Oct. 9, 2014.
(Continued)

*Primary Examiner* — Santiago Garcia

(57) ABSTRACT

A method in a mobile communication terminal includes holding a definition of a sub-sampled codebook identifying precoding matrices to be used for providing precoding feedback by the terminal. The precoding matrices in the sub-sampled codebook are selected from a master codebook that is made-up of a long-term sub-codebook and a short-term sub-codebook. The definition defines a first subset of the long-term sub-codebook and a second subset of the short-term sub-codebook. A Multiple-Input Multiple-Output (MIMO) signal is received in the terminal via multiple receive antennas. Based on the received MIMO signal, a precoding matrix is selected from the sub-sampled codebook for precoding subsequent MIMO signals transmitted to the terminal. The precoding feedback indicating the selected precoding matrix is calculated.

20 Claims, 2 Drawing Sheets

(51) Int. Cl.
*H04B 7/06* (2006.01)
*H04L 1/06* (2006.01)

(56) References Cited

U.S. PATENT DOCUMENTS

| | | | |
|---|---|---|---|
| 2008/0240274 | A1 | 10/2008 | Han et al. |
| 2009/0052405 | A1 | 2/2009 | Ko et al. |
| 2009/0274225 | A1 | 11/2009 | Khojastepour et al. |
| 2010/0172430 | A1* | 7/2010 | Melzer et al. ............ 375/267 |
| 2010/0278278 | A1* | 11/2010 | Lee et al. ............... 375/267 |
| 2011/0194594 | A1* | 8/2011 | Noh et al. ............... 375/224 |
| 2011/0310752 | A1 | 12/2011 | Kim et al. |
| 2012/0069917 | A1* | 3/2012 | Liu et al. ............... 375/259 |
| 2012/0219042 | A1* | 8/2012 | Onggosanusi et al. ..... 375/219 |
| 2012/0219083 | A1* | 8/2012 | Tong et al. .............. 375/267 |
| 2013/0016764 | A1* | 1/2013 | Kim et al. .............. 375/219 |
| 2013/0028068 | A1* | 1/2013 | Park et al. .............. 370/203 |
| 2013/0028344 | A1* | 1/2013 | Chen et al. .............. 375/267 |
| 2013/0039284 | A1* | 2/2013 | Marinier et al. .......... 370/329 |
| 2013/0089158 | A1 | 4/2013 | Wu et al. |

OTHER PUBLICATIONS

European Application # 11154002.7 Search Report dated Sep. 19, 2014.
JP Application # 2013-146952 Office Action dated Jul. 29, 2014.
Ericsson., "Precoding Considerations in LTE MIMO Downlink", TSG-RAN WGI1 #47bis, 12 pages, Sorrento, Italy, Jan. 15-19, 2007.
U.S. Appl. No. 14/215,093 Office Action dated Oct. 16, 2014.
Ericsson, "On the use of pre-coding in E-UTRA", 3GPP TSG RAN WG1 # 47, 3 pages, Riga, Latvia, Nov. 6-10, 2006.
Chinese Patent Application 201080057652.9 Office Action dated Apr. 1, 2014.
EP Patent Application #11183952.8 Search Report dated Jul. 20, 2015.
Panasonic, "8Tx Codebook Subsampling", 3GPP TSG RAN WG1 Meeting #62bis, R1-105491,Xi'an, China, 3 pages, Nov. 11-15, 2010.
Panasonic, "Double Codebook PUCCH Reporting in Rel-10", 3GPP TSG RAN WG1 Meeting #62bis, R1-105492 Xi'an, China, 3 pages, Nov. 11-15, 2010.
JP Patent Application #2011-215522 Office Action dated Jun. 9, 2015.
Texas Instruments, "PUCCH Mode 1-1 for Rel.10 Double-Codebook Precoding", 3GPP TSG RAN WG1 62bis, Xi'an, China, 10 pages, Oct. 11-15, 2010.
Huawei, "Down-sampling C1 and/or C2 for PUCCH Mode 1-1 in Rel.10", 3GPP TSG RAN WG1 62bis, Xi'an, China, 6 pages, Oct. 11-15, 2010.

* cited by examiner

US 9,178,591 B2

CODEBOOK SUBSAMPLING FOR PUCCH FEEDBACK

CROSS-REFERENCE TO RELATED APPLICATIONS

This application is a continuation of U.S. patent application Ser. No. 13/252,218, filed Oct. 4, 2011, which claims the benefit of U.S. Provisional Patent Application 61/390,511, filed Oct. 6, 2010, and U.S. Provisional Patent Application 61/392,431, filed Oct. 12, 2010. The disclosures of all these related applications are incorporated herein by reference.

FIELD OF THE DISCLOSURE

The present invention relates generally to communication systems, and particularly to methods and systems for providing channel feedback in wireless communication systems.

BACKGROUND

In some communication systems, a mobile communication terminal receives downlink signals from a base station over a communication channel, and sends feedback indicative of the communication channel to the base station. The base station configures subsequent transmissions based on the feedback. Channel feedback of this sort is used, for example, in Evolved Universal Terrestrial Radio Access (E-UTRA) systems specified by the 3$^{rd}$ Generation Partnership Project (3GPP). These systems are also referred to as Long Term Evolution (LTE) and LTE Advanced (LTE-A).

Channel feedback schemes for LTE and LTE-A systems are discussed, for example, in 3GPP Technical Specification Group Radio Access Network Working Group 1 (TSG-RAN WG1) document R1-104473, entitled "Way Forward on 8Tx Codebook for Rel. 10 DL MIMO," Madrid, Spain, Aug. 23-27, 2010; in 3GPP TSG-RAN WG1 document R1-105067, entitled "Way Forward on CSI Feedback for Rel. 10 DL MIMO," Madrid, Spain, Aug. 23-27, 2010; in 3GPP TSG-RAN WG1 document R1-103839, entitled "Design and Evaluation of Precoder Codebooks for CSI Feedback," Dresden, Germany, Jun. 28-Jul. 2, 2010; and in 3GPP TSG-RAN WG1 document R1-104353, entitled "Two-Component PMI Codebook for 8TX," Madrid, Spain, Aug. 23-27, 2010, which are all incorporated herein by reference.

The description above is presented as a general overview of related art in this field and should not be construed as an admission that any of the information it contains constitutes prior art against the present patent application.

SUMMARY

An embodiment that is described herein provides a method in a mobile communication terminal. The method includes holding a definition of a sub-sampled codebook identifying precoding matrices to be used for providing precoding feedback by the terminal. The precoding matrices in the sub-sampled codebook are selected from a master codebook that is made-up of a long-term sub-codebook and a short-term sub-codebook. The definition defines a first subset of the long-term sub-codebook and a second subset of the short-term sub-codebook. A Multiple-Input Multiple-Output (MIMO) signal is received in the terminal via multiple receive antennas. Based on the received MIMO signal, a precoding matrix is selected from the sub-sampled codebook for precoding subsequent MIMO signals transmitted to the terminal. The precoding feedback indicating the selected precoding matrix is calculated.

In some embodiments, the method includes transmitting the precoding feedback from the terminal. In a disclosed embodiment, transmitting the precoding feedback includes sending the precoding feedback over a Physical Uplink Control Channel (PUCCH). In an embodiment, sending the precoding feedback includes formatting the precoding feedback using a number of bits that is less than a total number of bits allocated to the precoding feedback in the PUCCH.

In an embodiment, the long-term sub-codebook and the short-term sub-codebook are each formed of sixteen precoding matrices having first indices {0 ... 15} and second indices {0 ... 15}, respectively, the first subset is formed of eight precoding matrices having the first indices {0,2,4,6,8,10,12,14} in the long-term sub-codebook, and the second subset is formed of two precoding matrices having the second indices {0,2} or four precoding matrices having the second indices {0,1,2,3}. In another embodiment, the long-term sub-codebook and the short-term sub-codebook are each formed of sixteen precoding matrices having first indices {0 ... 15} and second indices {0 ... 15}, respectively, the first subset is formed of eight precoding matrices having the first indices {0,2,4,6,8,10,12,14} in the long-term sub-codebook, and the second subset is formed of two precoding matrices having the second indices {0,1}.

In yet another embodiment, the long-term sub-codebook and the short-term sub-codebook are each formed of sixteen precoding matrices having first indices {0 ... 15} and second indices {0 ... 15}, respectively, the first subset is formed of eight precoding matrices having the first indices {0,2,4,6,8,10,12,14} in the long-term sub-codebook, and the second subset is formed of four precoding matrices having the second indices {0,2,8,10}. In still another embodiment, both the long-term sub-codebook and the first subset are formed of sixteen precoding matrices having first indices {0 ... 15}, both the short-term sub-codebook and the second subset are formed of sixteen precoding matrices having second indices {0 ... 15}, and selecting the precoding matrix includes selecting from the first subset a first precoding matrix, and selecting from the second subset a second precoding matrix whose second index is a modulo 2 or modulo 4 of a first index of the first precoding matrix.

In an embodiment, the method includes transmitting the precoding feedback and indicating in the precoding feedback only the first index and not the second index. In a disclosed embodiment, calculating the precoding feedback includes choosing one of the precoding matrices from the first subset and combining an indication of the chosen precoding matrix with a Rank Indication (RI) to produce four or five bits of the precoding feedback. In an embodiment, the combined indication of the chosen precoding matrix and the RI includes five bits, the long-term sub-codebook is formed of sixteen precoding matrices having indices {0 ... 15}, and choosing the precoding matrix includes choosing the matrix from among the precoding matrices having the indices {0,2,4,6,8,10,12,14}. In an embodiment, selecting the precoding matrix includes selecting a respective first precoding matrix from the first subset of the long-term sub-codebook, and selecting a respective second precoding matrix from the second subset of the short-term sub-codebook.

There is additionally provided, in accordance with an embodiment that is described herein, apparatus including a memory, a receiver and processing circuitry. The memory is configured to hold a definition of a sub-sampled codebook identifying precoding matrices to be used for providing precoding feedback by the terminal. The precoding matrices in the sub-sampled codebook are selected from a master codebook that is made-up of a long-term sub-codebook and a short-term sub-codebook, and the definition defines a first subset of the long-term sub-codebook and a second subset of the short-term sub-codebook. The receiver is configured to receive a Multiple-Input Multiple-Output (MIMO) signal via multiple receive antennas. The processing circuitry is configured to select from the sub-sampled codebook a precoding matrix for precoding subsequent MIMO signals, and to calculate the precoding feedback indicating the selected precoding matrix.

In some embodiments, a mobile communication terminal includes the disclosed apparatus. in some embodiments, a chipset for processing signals in a mobile communication terminal includes the disclosed apparatus.

The present disclosure will be more fully understood from the following detailed description of the embodiments thereof, taken together with the drawings in which:

DETAILED DESCRIPTION OF EMBODIMENTS

Figure 1:
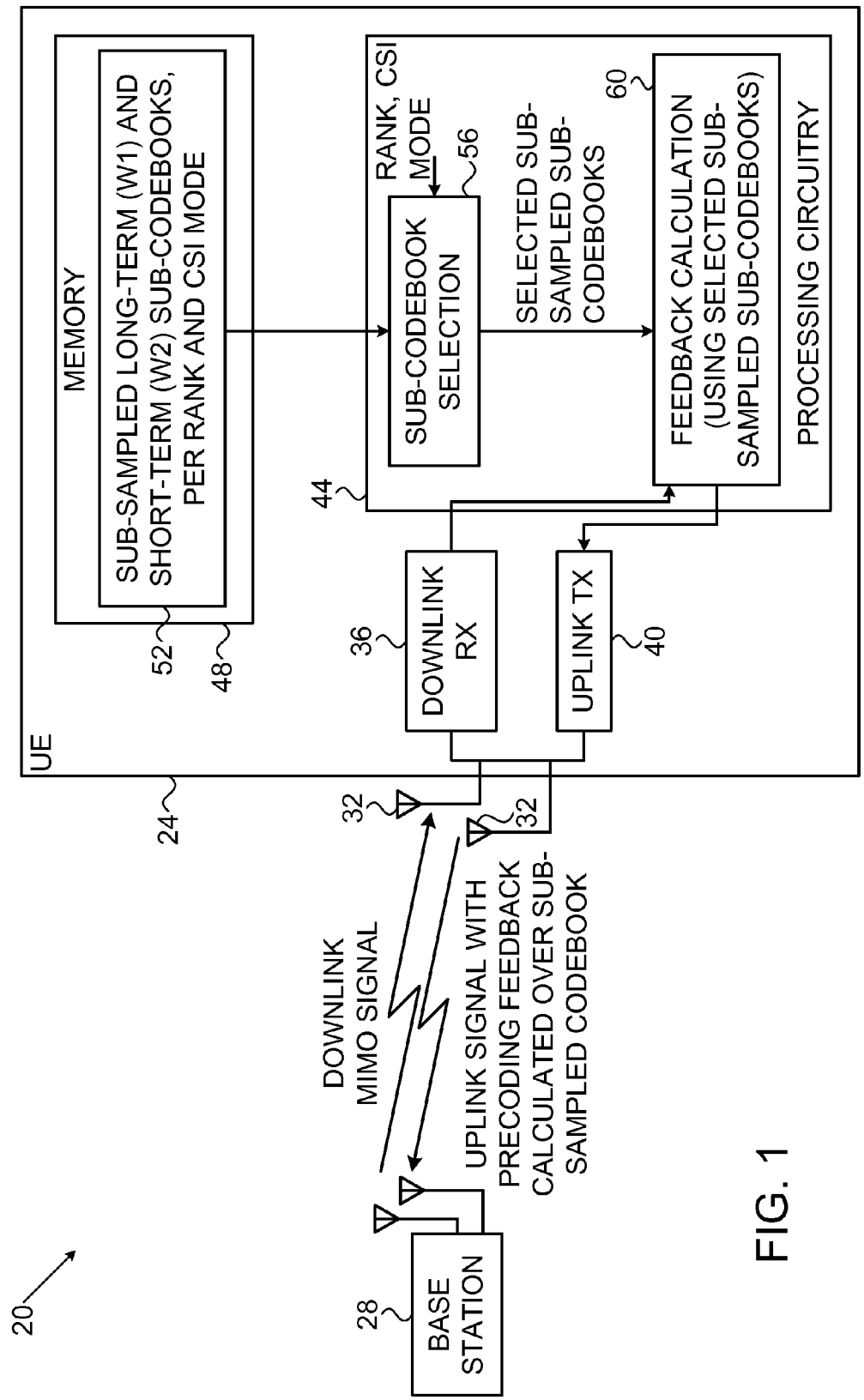
FIG. 1 is a block diagram that schematically illustrates a communication system, in accordance with an embodiment that is described herein.

Embodiments that are described herein provide improved channel feedback schemes for use in LTE, LTE-A and any other suitable mobile wireless communication networks. In some embodiments, a mobile communication terminal (referred to as a User Equipment—UE) receives a downlink Multiple-Input Multiple Output (MIMO) signal from a base station. The received downlink signal is typically precoded with a certain precoding scheme—A set of weights that are applied to the base station antennas. Each precoding scheme is typically represented by a precoding matrix. Based on the received downlink signal, the UE calculates precoding feedback that is indicative of the precoding matrix preferred by the UE for precoding subsequent transmissions by the base station. The UE then transmits the precoding feedback to the base station.

In an embodiment, the UE selects the preferred precoding matrix from a codebook that is agreed upon between the UE and the base station, and the precoding feedback indicates the index of the selected precoding matrix in the codebook. This sort of feedback is sometimes referred to as Precoding Matrix Indication (PMI). In LTE Release 10, for example, a codebook for the case of eight base station antennas (8TX) is defined in 3GPP TSG-RAN WG1 document R1-104473, cited above. Typically, the codebook is defined per rank, i.e., per each number of simultaneous data streams (also referred to as spatial streams or spatial layers) that are transmitted from the base station to the UE in the downlink MIMO signal.

In some embodiments, the UE transmits the precoding feedback to the base station, possibly along with other types of feedback, over a Physical Uplink Control Channel (PUCCH). The PUCCH has only a limited number of bits for allocating to feedback information. Therefore, in the disclosed embodiments, the UE uses a sub-sampled codebook that is selected from a certain master codebook in order to reduce the feedback bandwidth. The disclosed embodiments provide several examples of sub-sampled precoding codebooks for use over the PUCCH in various operational modes.

In some embodiments, the master codebook is made-up of a combination of a long-term sub-codebook denoted W1 and a short-term sub-codebook denoted W2, and each precoding scheme comprises a combination of a precoding matrix selected from the long-term sub-codebook and a precoding matrix selected from the short-term sub-codebook. Generally, the long-term sub-codebook typically represents the component of the precoding operation that changes relatively slowly, and the short-term sub-codebook represents the component of the precoding operation that changes more quickly. In these embodiments, each sub-sampled codebook is defined as a combination of a subset of the long-term sub-codebook and a subset of the short-term sub-codebook.

In some embodiments, the UE is configured to provide the precoding feedback in one of several predefined Channel State Information (CSI) modes. In a disclosed embodiment, the UE holds multiple sub-sampled codebooks corresponding to various ranks and CSI modes. The UE calculates the precoding feedback by first selecting the appropriate sub-sampled codebook for the applicable rank and CSI mode, and then chooses the preferred precoding matrix from the selected sub-sampled codebook. Several examples of sub-sampled codebooks for various ranks and CSI modes are described in detail below.

The methods and systems described herein optimize the sub-sampling of the master codebook, so as to provide accurate precoding feedback using the limited bandwidth resources of the PUCCH. By providing accurate precoding feedback, the disclosed techniques enable the base station to increase the downlink throughput.

FIG. 1 is a block diagram that schematically illustrates a communication system 20, in accordance with an embodiment that is described herein. System 20 comprises a mobile communication terminal 24, also referred to as a User Equipment (UE). The UE may comprise, for example, a cellular phone, a wireless-enabled mobile computer, or any other suitable type of terminal having communication capabilities. UE 24 communicates with a base station (BS) 28, also referred to as an eNodeB.

In the embodiments described herein, system 20 operates in accordance with the LTE-A specifications. Alternatively, however, system 20 may operate in accordance with any other suitable communication protocol.

The example of FIG. 1 shows only a single BS and a single UE for the sake of clarity. Real-life systems, however, typically comprise multiple BSs and UEs.

UE 24 comprises one or more antennas 32 for receiving downlink MIMO signals from BS 28 and for transmitting uplink signals to the BS. A downlink receiver (RX) 36 receives the downlink signals and an uplink transmitter (TX) 40 transmits the uplink signals. UE 24 further comprises processing circuitry 44 and a memory 48. Memory 48 holds a definition of sub-sampled long-term and short-term sub-codebooks, a respective pair of sub-sampled long- and short-term sub-codebooks per each rank and CSI mode supported by the UE. In a given pair, the long-term sub-codebook is formed of a subset of the precoding matrices in the long-term sub-codebook of the master codebook. The short-term sub-codebook in the given pair is formed of a subset of the precoding matrices in the short-term sub-codebook of the master codebook. Both subsets of precoding matrices are typically defined in advance, e.g., by simulation, so as to provide optimal precoding accuracy for the given rank and CSI mode.

In the embodiment seen in FIG. 1, processing circuitry 44 comprises a sub-code selection unit 56, which selects the appropriate pair of sub-sampled sub-codebooks for the applicable rank and CSI mode. A feedback calculation unit 60 chooses a preferred precoding scheme based on the received downlink MIMO signal. Unit 60 chooses the precoding scheme from within the pair of sub-sampled sub-codebooks selected by unit 56. The preferred precoding scheme comprises a precoding matrix from the subset of long-term precoding matrices in that pair, and a precoding matrix from the subset of short-term precoding matrices in that pair.

Feedback calculation unit 60 formats precoding feedback that is indicative of the preferred precoding scheme. The precoding feedback uses some or all of the available bits in the PUCCH. Unit 60 provides the precoding feedback to uplink transmitter 40, which transmits the precoding feedback to BS 28 over the PUCCH. BS 28 typically decodes the precoding feedback from the PUCCH and uses the feedback in deciding on the precoding of subsequent downlink transmissions.

The UE configuration shown in FIG. 1 is an example configuration, which is depicted solely for the sake of clarity. In alternative embodiments, any other suitable UE configuration can be used. UE elements that are not mandatory for understanding of the disclosed techniques have been omitted from the figure for the sake of clarity.

In various embodiments, some or all of the elements of UE 24, including downlink receiver 36, uplink transmitter 40, processing circuitry 44 and/or memory 48, are implemented in hardware, such as using one or more Radio Frequency Integrated Circuits (RFICs), Field-Programmable Gate Arrays (FPGAs) or Application-Specific Integrated Circuits (ASICs). Memory 48 comprises any suitable type of memory device, for example Random Access Memory (RAM) or non-volatile memory such as Flash memory. In alternative embodiments, certain UE elements are implemented in software, or using a combination of hardware and software elements. In some embodiments, some or all of the elements of UE 24, including receiver 36, transmitter 40, processing circuitry 44 and/or memory 48, are implemented in a signal processing chip-set for use in mobile communication terminals.

In some embodiments, certain UE elements, such as certain elements of processing circuitry 44, are implemented in a programmable processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

In some embodiments, the master codebook from which the various sub-sampled sub-codebooks are derived is the 8TX codebook defined in 3GPP TSG-RAN WG1 document R1-104473, cited above. This master codebook assigns the following number of bits for long-term (W1) and short-term (W2) precoding feedback, depending on rank:

TABLE 1

Allocation of W1 and W2
precoding feedback bits

| Rank | (W1, W2) bits |
|---|---|
| 1 | (4, 4) |
| 2 | (4, 4) |
| 3 | (2, 4) |
| 4 | (2, 3) |
| 5 | (2, 0) |
| 6 | (2, 0) |

TABLE 1-continued

Allocation of W1 and W2
precoding feedback bits

| Rank | (W1, W2) bits |
|---|---|
| 7 | (2, 0) |
| 8 | (0, 0) |

In some embodiments, UE 24 reports the precoding feedback over the PUCCH in one of two predefined reporting modes, also referred to as CSI modes. The two modes are denoted "CSI 1" and "CSI 2". These modes are defined in 3GPP TSG-RAN WG1 document R1-105067, cited above. In each reporting mode, the UE reports the W1 and W2 bits, as well as a Rank Indication (RI) and a Channel Quality Indication (CQI). The feedback is reported in two successive uplink sub-frames denoted "report 1" and "report 2", according to the following table:

TABLE 2

PUCCH CSI reporting modes

| PUCCH CSI reporting mode | Report 1 | Report 2 |
|---|---|---|
| CSI mode 1 | RI, W1 | CQI, W2 |
| CSI mode 2 | RI | CQI, W1, W2 |

In order to fit the limited bandwidth resources of the PUCCH, UE 24 typically uses reduced-size, or sub-sampled, sub-codebooks in both reporting modes. In CSI mode 1, for example, Report 1 is typically the bottleneck since the long-term feedback (W1) should be robust to errors. In CSI mode 2, as another example, only eleven bits are available for precoding feedback. Thus, in CSI mode 1 the long-term (W1) sub-codebook should be sub-sampled, and in CSI mode 2 both the W1 and W2 sub-codebooks should be sub-sampled. Several examples of such sub-sampled sub-codebooks are described below. Simulation results related to these techniques are given in U.S. Provisional Patent Applications 61/390,511 and 61/392,431, cited above, and in 3GPP TSG-RAN WG1 document R1-105885, entitled "Details of PUCCH 1-1 for 8TX," Jacksonville, Fla., Nov. 15-19, 2010, which is incorporated herein by reference in its entirety.

In some embodiments, the codebook sub-sampling is related to possible implementations of the base station antennas. In some base stations, the transmit antennas used for transmitting the downlink MIMO signals are arranged in a linear array of co-polarized antennas having uniform spacing. This kind of array is denoted OLA. In other base stations, the transmit antennas are arranged in two linear arrays of co-polarized antennas, such that the two arrays have a 90-degree polarization relative to one another. This kind of array is denoted X-POL.

The bits assigned for precoding feedback can be divided into bits that indicate the direction of the transmission beam (these bits are denoted Discrete Fourier Transform (DFT) bits) and bits that indicate the relative phase between the two X-POL antenna arrays (these bits are denoted X-POL bits). Generally speaking, the beam direction varies relatively slowly, while the relative phase between the X-POL antenna arrays varies more rapidly. Thus, the DFT bits are sometimes associated with the long-term (W1) feedback and the X-POL bits are sometimes associated with the short-term (W2) feedback. This heuristic relationship, although not exact, can be used for finding efficient sub-sampling of the long- and short-term sub-codebooks.

In an embodiment, for rank 1, the master codebook (denoted W) can be parameterized according to the two above-described parameters—beam angle (DFT angle) and relative X-POL phase. The sub-sampling problem thus translates to the problem of assigning the optimal number of DFT bits and X-POL bits. This sort of optimal bit allocation can be found, for example, by simulation.

In an embodiment, for the case of rank 2, in addition to the DFT angle and the relative X-POL phase, it is possible to parameterize the master codebook W according to the difference in DFT angle between the two columns of the base station precoder. In an embodiment, for a master codebook in which the DFT angle is indexed between 0 and 31, the DFT angle offset between precoder columns ranges from 0 to 3.

In some embodiments, the W1 codebook is common to both rank 1 and rank 2, and therefore the sub-sampled codebook is elected to have a common W1 sub-codebook for rank 1 and rank 2, as well. Based on these guidelines and constraints, example sub-sampled long-term (W1) and short-term (W2) sub-codebooks for rank 1 and rank 2 in CSI mode 2 are given in the following table:

TABLE 3

Example codebook sub-sampling

| | W1 sub-codebook for ranks 1 and 2 | W2 sub-codebook for rank 1 | W2 sub-codebook for rank 2 |
|---|---|---|---|
| Embodiment I | 3 bits, $i_1$ drawn from $\{0, 2, 4, \ldots, 14\}$ | 1 bit, $i_2$ drawn from $\{0, 2\}$ OR 2 bits, $i_2$ drawn from $\{0, 1, 2, 3\}$ | 1 bit, $i_2$ drawn from $\{0, 1\}$ |
| Embodiment II | 3 bits, $i_1$ drawn from $\{0, 2, 4, \ldots, 14\}$ | 2 bits, $i_2$ drawn from $\{0, 2, 8, 10\}$ | 1 bit, $i_2$ drawn from $\{0, 1\}$ |
| Embodiment III | 4 bits, $i_1$ drawn from $\{0, 1, 2, \ldots, 15\}$ | 0 bits, $i_2 = i_1 \bmod 4$ | 0 bits, $i_2 = i_1 \bmod 2$ |

In the above examples, the master codebook W is formed from a long-term sub-codebook and a short-term sub-codebook, each having sixteen precoding matrices indexed $\{0, 1, \ldots, 15\}$. The notation and indexing of the precoding matrices is in accordance with the definitions given in 3GPP Technical Specification TS 36.213, entitled "LTE; Evolved Universal Terrestrial Radio Access (E-UTRA); Physical Layer Procedures," version 10.2.0, Release 10, July, 2011, which is incorporated herein by reference.

In the examples of Table 3, $i_1$ denotes the indices of the precoding matrices that are included in the sub-sampled long-term sub-codebook, and $i_2$ denotes the indices of the precoding matrices that are included in the sub-sampled short-term sub-codebook. Note that in Embodiment III, no short-term precoding feedback is sent at all. In this embodiment, the short-term precoding feedback ($i_2$) is deduced by the base station from the long-term precoding feedback ($i_1$) using a modulo operation. Note also that Embodiment I and Embodiment II satisfy the nesting property, i.e., the columns of higher rank precoders are part of the lower rank precoders. For example, the columns of all the rank-2 precoders belong to the rank-1 codebook.

In some embodiments, the PUCCH has a certain number of bits available for allocation to precoding feedback, but UE 24 uses less than the available number of bits for formatting the feedback. In one example embodiment, the PUCCH has a total of eleven bits available for CSI feedback. For rank 1, four bits are used for CQI feedback, leaving seven bits for precoding feedback. In one embodiment, Feedback calculation unit 60 uses only four of the seven bits for formatting the precoding feedback (and the sub-sampled sub-codebooks are defied accordingly).

The reason for not using all of the available bits is that the probability of error in decoding the feedback at the base station grows with the actual number of bits being used. For example, the probability of errors when decoding seven bits is higher than when decoding four bits. In some practical cases, the resulting downlink throughput for seven and four bits of precoding feedback is similar. In such cases, it is preferable for UE 24 to use a smaller number of feedback bits in order to reduce the error probability.

In an embodiment, in CSI mode 2, the sub-sampled sub-codebook for rank 1 is represented using four or five bits. For four-bit sub-sampling, the sub-sampled sub-codebook is formed of the following three-bit long-term (W1) sub-codebook and a one-bit short-term (W2) sub-codebook:

$$C_1 = \{W_1^{(0)}, W_1^{(2)}, W_1^{(4)}, \ldots, W_1^{(14)}\} \quad \text{Equation 1}$$

$$W_2 \in C_2 = \left\{ \frac{1}{\sqrt{2}} \begin{bmatrix} Y \\ Y \end{bmatrix}, \frac{1}{\sqrt{2}} \begin{bmatrix} Y \\ -Y \end{bmatrix} \right\}$$

$$Y = \tilde{e}_1$$

For five-bit sub-sampling, the sub-sampled sub-codebook is give by:

$$W_2 \in C_2 = \left\{ \frac{1}{\sqrt{2}} \begin{bmatrix} Y \\ Y \end{bmatrix}, \frac{1}{\sqrt{2}} \begin{bmatrix} Y \\ -Y \end{bmatrix} \right\} \quad \text{Equation 2}$$

$$Y = \{\tilde{e}_1, \tilde{e}_3\}$$

Equations 1 and 2 use the notation of TSG-RAN WG1 document R1-104473, cited above, wherein $C_1$ denotes the long-term sub-sampled sub-codebook. Vectors $\tilde{e}_1$ and $\tilde{e}_3$ denote column selectors that select the first and third columns, respectively, of a matrix left-multiplied by them. For example, $A\tilde{e}_3$, produces the third column of matrix A.

For the case of no feedback errors, the sub-sampled codebook typically uses all seven available bits. The long-term sub-sampled sub-codebook in this embodiment is:

$$C_1 = \{W_1^{(0)}, W_1^{(2)}, W_1^{(4)}, \ldots, W_1^{(14)}\} \quad \text{Equation 3:}$$

and the short-term sub-sampled sub-codebook is the original short-term sub-codebook.

In an embodiment, in CSI mode 2 rank 2, the sub-sampled sub-codebooks are given by:

$$C_1 = \{W_1^{(0)}, W_1^{(2)}, W_1^{(4)}, \ldots, W_1^{(14)}\} \quad \text{Equation 4}$$

$$W_2 \in C_2 =$$

$$\left\{ \frac{1}{\sqrt{2}} \begin{bmatrix} Y \\ Y \end{bmatrix}, \frac{1}{\sqrt{2}} \begin{bmatrix} Y \\ jY \end{bmatrix}, \frac{1}{\sqrt{2}} \begin{bmatrix} Y \\ -Y \end{bmatrix}, \frac{1}{\sqrt{2}} \begin{bmatrix} Y \\ -jY \end{bmatrix} \right\}$$

$$Y = \{\tilde{e}_1, \tilde{e}_3\}$$

In an embodiment, for rank 2, the sub-sampled sub-codebook is selected to have a total of four bits, three of which comprise DFT bits and one bit comprises an X-POL bit, and an offset of 1 between the precoder columns. In this embodiment, the sub-sampled sub-codebooks are given by:

$$C_1 = \{W_1^{(0)}, W_1^{(2)}, W_1^{(4)}, \ldots, W_1^{(14)}\}$$ Equation 5

$$W_2 \in C_2 = \left\{ \frac{1}{2}\begin{bmatrix} Y_1 & Y_2 \\ Y_1 & -Y_2 \end{bmatrix}, \frac{1}{2}\begin{bmatrix} Y_1 & Y_2 \\ jY_1 & -jY_2 \end{bmatrix} \right\}$$

$$Y_1 = \tilde{e}_1, Y_2 = \tilde{e}_3$$

The examples above refer to CSI mode 2 reporting. The following description refers to CSI mode 1 reporting. In CSI mode 1, the RI bits are encoded together with the W1 bits in the same sub-frame. In some embodiments, the UE defines the size of the sub-sampled long-term (W1) sub-codebook depending on the rank. For a given size, the long-term sub-codebook of the master codebook is typically sampled uniformly to produce the sub-sampled long-term sub-codebook.

In some embodiments, for a UE that is configured to provide feedback for up to rank 8, the size of the sub-sampled W1 sub-codebook (i.e., the number of W1 precoding matrices in the sub-sampled sub-codebook) for CSI mode 1 is given by:

TABLE 4

Allocation of W1 sub-codebook in CSI mode 1

| Rank | Original (W1, W2) bits in master codebook | Number of W1 matrices, assuming a total of 5 bits for RI + W1 | Number of W1 matrices, assuming a total of 4 bits for RI + W1 |
|---|---|---|---|
| 1 | (4, 4) | 8 | 4 |
| 2 | (4, 4) | 8 | 4 |
| 3 | (3, 4) | 4 | 2 |
| 4 | (3, 3) | 4 | 2 |
| 5 | (2, 0) | 2 | 1 |
| 6 | (2, 0) | 2 | 1 |
| 7 | (2, 0) | 2 | 1 |
| 8 | (1, 0) | 1 | 1 |

The table gives the W1 sub-codebook size for two assumptions: A total of five bits allocated to the combined RI and W1 report, and a total of four bits allocated to the combined RI and W1 report. The error probability for four bits is lower than the error probability of five bits.

The total number of bits for the combined RI and W1 report, in accordance with an embodiment, is given in the following table as a function of the number of UE receive antennas 32:

TABLE 5

Total number of RI + W1 bits

| Number of UE receive antennas | Total number of RI + W1 bits |
|---|---|
| Embodiment A: | |
| 2 | 4 |
| 4 | 5 |
| 8 | 5 |
| Embodiment B: | |
| 2 | 3 |
| 4 | 4 |
| 8 | 4 |

In the above-described embodiments, either two or three bits of W1 can be combined with RI for rank 1. Example simulation results for these numbers of bits, and considering possible effects on error probability, are given in U.S. Provisional Patent Applications 61/390,511 and 61/392,431, cited above, and in 3GPP TSG-RAN WG1 document R1-105885, cited above. Various uplink error models can be used for this purpose. The simulation results use a model that is described in 3GPP TSG-RAN WG1 document R1-105886, cited above. These references are all incorporated herein by reference in their entirety.

Thus, in an embodiment, in CSI mode 1, the total allocation for RI+W1 is five bits according to the allocation given in Table 5 above. The W1 matrices are selected in these embodiments from the set of indices {0,2,4,6,8,10,12,14}.

Figure 2:
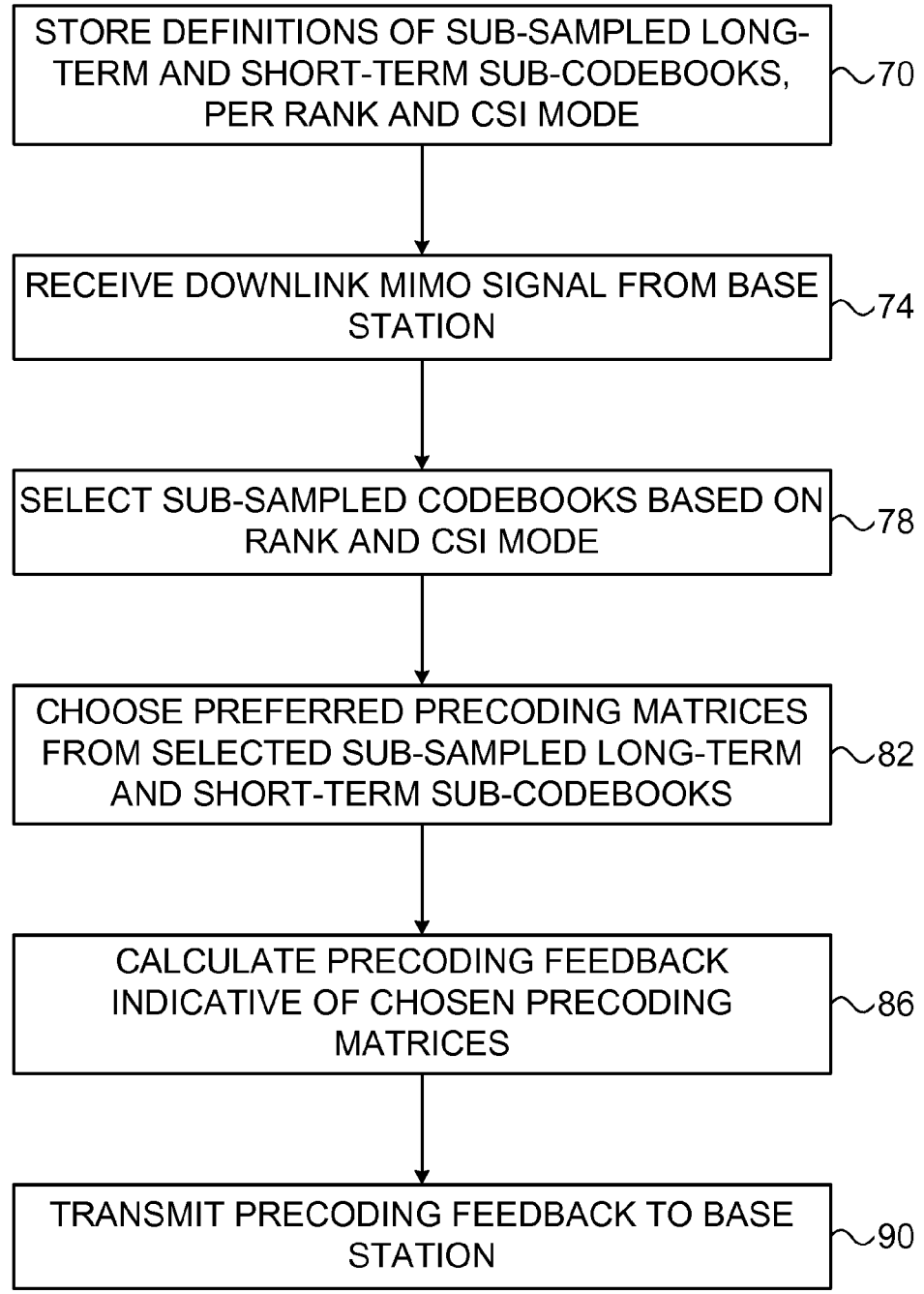
FIG. 2 is a flow chart that schematically illustrates a method for providing precoding feedback, in accordance with an embodiment that is described herein.

FIG. 2 is a flow chart that schematically illustrates a method for providing precoding feedback, in accordance with an embodiment that is described herein. The method begins with UE 24 storing in memory 52 a definition of long-term and short-term sub-codebooks, sub-sampled per rank and CSI mode, at an initialization operation 70. Any suitable sub-sampled codebooks, such as the codebooks described above, can be used.

Downlink receiver 36 receives a downlink MIMO signal from base station 28, at a reception operation 74. Sub-codebook selection unit 56 selects the appropriate sub-sampled sub-codebooks for the applicable rank and CSI mode, at a sub-codebook selection operation 78.

Based on the received downlink MIMO signal, feedback calculation unit 60 chooses a preferred pre-coding scheme from the sub-sampled codebook selected at operation 78 above. Typically, the selected sub-sampled codebook comprises a long-term sub-sampled sub-codebook and a short-term sub-sampled sub-codebook, and the chosen precoding scheme comprises a respective pair of precoding matrices, one from each sub-sampled sub-codebook.

Feedback calculation unit 60 calculates precoding feedback that is indicative of the chosen preferred precoding scheme, at a feedback calculation operation 86. Unit 60 provides the precoding feedback to uplink transmitter 40. The uplink transmitter transmits the precoding feedback to base station 28 over the PUCCH, at an uplink transmission operation 90. The base station typically configures (e.g., precodes) its subsequent downlink transmissions using the feedback.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:

in a mobile communication terminal, holding a definition of a sub-sampled codebook identifying precoding matrices to be used for providing precoding feedback by the terminal, wherein the precoding matrices in the sub-sampled codebook are selected from a master codebook that is made-up of a first sub-codebook and a second sub-codebook, wherein the first sub-codebook represents a first precoding component and the second sub-codebook represents a second precoding component that varies more rapidly than the first precoding component, and wherein the definition defines a first subset of the first sub-codebook and a second subset of the second sub-codebook;

receiving in the terminal a Multiple-Input Multiple-Output (MIMO) signal via multiple receive antennas; and based on the received MIMO signal, selecting from the sub-sampled codebook a precoding matrix for precoding subsequent MIMO signals transmitted to the terminal, by combining a first matrix selected from the first sub-codebook and a second matrix selected from the second sub-codebook, and calculating the precoding feedback indicating the selected precoding matrix.

2. The method according to claim 1, comprising transmitting the precoding feedback from the terminal.

3. The method according to claim 2, wherein transmitting the precoding feedback comprises sending the precoding feedback over a Physical Uplink Control Channel (PUCCH).

4. The method according to claim 3, wherein sending the precoding feedback comprises formatting the precoding feedback using a number of bits that is less than a total number of bits allocated to the precoding feedback in the PUCCH.

5. The method according to claim 1, wherein the first sub-codebook and the second sub-codebook are each formed of sixteen precoding matrices having first indices {0 . . . 15} and second indices {0 . . . 15}, respectively, wherein the first subset is formed of eight precoding matrices having the first indices {0,2,4,6,8,10,12,14} in the first sub-codebook, and wherein the second subset is formed of two precoding matrices having the second indices {0,2} or four precoding matrices having the second indices {0,1,2,3}.

6. The method according to claim 1, wherein the first sub-codebook and the second sub-codebook are each formed of sixteen precoding matrices having first indices {0 . . . 15} and second indices {0 . . . 15}, respectively, wherein the first subset is formed of eight precoding matrices having the first indices {0,2,4,6,8,10,12,14} in the first sub-codebook, and wherein the second subset is formed of two precoding matrices having the second indices {0,1}.

7. The method according to claim 1, wherein the first sub-codebook and the second sub-codebook are each formed of sixteen precoding matrices having first indices {0 . . . 15} and second indices {0 . . . 15}, respectively, wherein the first subset is formed of eight precoding matrices having the first indices {0,2,4,6,8,10,12,14} in the first sub-codebook, and wherein the second subset is formed of four precoding matrices having the second indices {0,2,8,10}.

8. The method according to claim 1, wherein both the first sub-codebook and the first subset are formed of sixteen precoding matrices having first indices {0 . . . 15}, wherein both the second sub-codebook and the second subset are formed of sixteen precoding matrices having second indices {0 . . . 15}, and wherein selecting the precoding matrix comprises selecting from the first subset a first precoding matrix, and selecting from the second subset a second precoding matrix whose second index is a modulo 2 or modulo 4 of a first index of the first precoding matrix.

9. The method according to claim 8, comprising transmitting the precoding feedback and indicating in the precoding feedback only the first index and not the second index.

10. The method according to claim 1, wherein calculating the precoding feedback comprises choosing one of the precoding matrices from the first subset and combining an indication of the chosen precoding matrix with a Rank Indication (RI) to produce four or five bits of the precoding feedback.

11. The method according to claim 10, wherein the combined indication of the chosen precoding matrix and the RI comprises five bits, wherein the first sub-codebook is formed of sixteen precoding matrices having indices {0 . . . 15}, and wherein choosing the precoding matrix comprises choosing the matrix from among the precoding matrices having the indices {0,2,4,6,8,10,12,14}.

12. Apparatus, comprising:

a memory, which is configured to hold a definition of a sub-sampled codebook identifying precoding matrices to be used for providing precoding feedback by the terminal, wherein the precoding matrices in the sub-sampled codebook are selected from a master codebook that is made-up of a first sub-codebook and a second sub-codebook, wherein the first sub-codebook represents a first precoding component and the second sub-codebook represents a second precoding component that varies more rapidly than the first precoding component, and wherein the definition defines a first subset of the first sub-codebook and a second subset of the second sub-codebook;

a receiver, which is configured to receive a Multiple-Input Multiple-Output (MIMO) signal via multiple receive antennas; and processing circuitry, which is configured to select from the sub-sampled codebook a precoding matrix for precoding subsequent MIMO signals, by combining a first matrix selected from the first sub-codebook and a second matrix selected from the second sub-codebook, and to calculate the precoding feedback indicating the selected precoding matrix.

13. The apparatus according to claim 12, wherein the processing circuitry is configured to format the precoding feedback using a number of bits that is less than a total number of bits allocated to the precoding feedback.

14. The apparatus according to claim 12, wherein the first sub-codebook and the second sub-codebook are each formed of sixteen precoding matrices having first indices {0 . . . 15} and second indices {0 . . . 15}, respectively, wherein the first subset is formed of eight precoding matrices having the first indices {0,2,4,6,8,10,12,14} in the first sub-codebook, and wherein the second subset is formed of two precoding matrices having the second indices {0,2} or four precoding matrices having the second indices {0,1,2,3}.

15. The apparatus according to claim 12, wherein the first sub-codebook and the second sub-codebook are each formed of sixteen precoding matrices having first indices {0 . . . 15} and second indices {0 . . . 15}, respectively, wherein the first subset is formed of eight precoding matrices having the first indices {0,2,4,6,8,10,12,14} in the first sub-codebook, and wherein the second subset is formed of two precoding matrices having the second indices {0,1}.

16. The apparatus according to claim 12, wherein the first sub-codebook and the second sub-codebook are each formed of sixteen precoding matrices having first indices {0 . . . 15} and second indices {0 . . . 15}, respectively, wherein the first subset is formed of eight precoding matrices having the first indices {0,2,4,6,8,10,12,14} in the first sub-codebook, and wherein the second subset is formed of four precoding matrices having the second indices {0,2,8,10}.

17. The apparatus according to claim 12, wherein both the first sub-codebook and the first subset are formed of sixteen precoding matrices having first indices {0 . . . 15}, wherein both the second sub-codebook and the second subset are formed of sixteen precoding matrices having second indices {0 . . . 15}, and wherein the processing circuitry is configured to select from the first subset a first precoding matrix, and to select from the second subset a second precoding matrix whose second index is a modulo 2 or modulo 4 of a first index of the first precoding matrix.

18. The apparatus according to claim 12, wherein the first sub-codebook is formed of sixteen precoding matrices having indices {0 . . . 15}, and wherein the processing circuitry is configured to choose one of the precoding matrices having the indices {0,2,4,6,8,10,12,14} from the first subset, and to combine an indication of the chosen precoding matrix with a Rank Indication (RI) to produce five bits of the precoding feedback.

19. A mobile communication terminal comprising the apparatus of claim 12.

20. A chipset for processing signals in a mobile communication terminal, comprising the apparatus of claim 12.

\* \* \* \* \*